March 29, 1932.  E. H. KELLEY ET AL  1,851,123
AUTOMOBILE BRAKE TESTING DEVICE
Filed March 16, 1928  3 Sheets-Sheet 1

INVENTORS
E. H. Kelley,
G. A. Stewart, Jr.
BY
ATTORNEYS

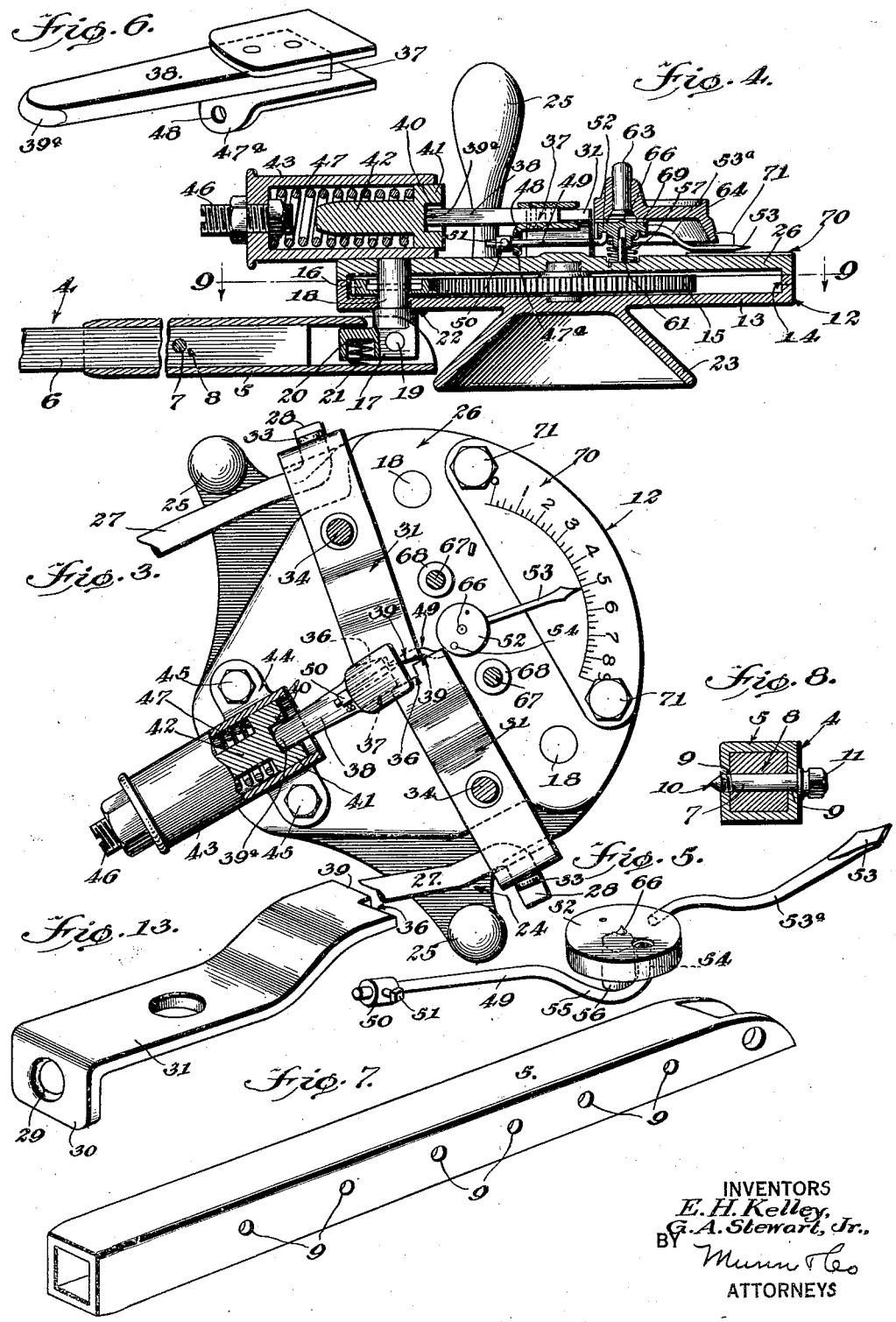

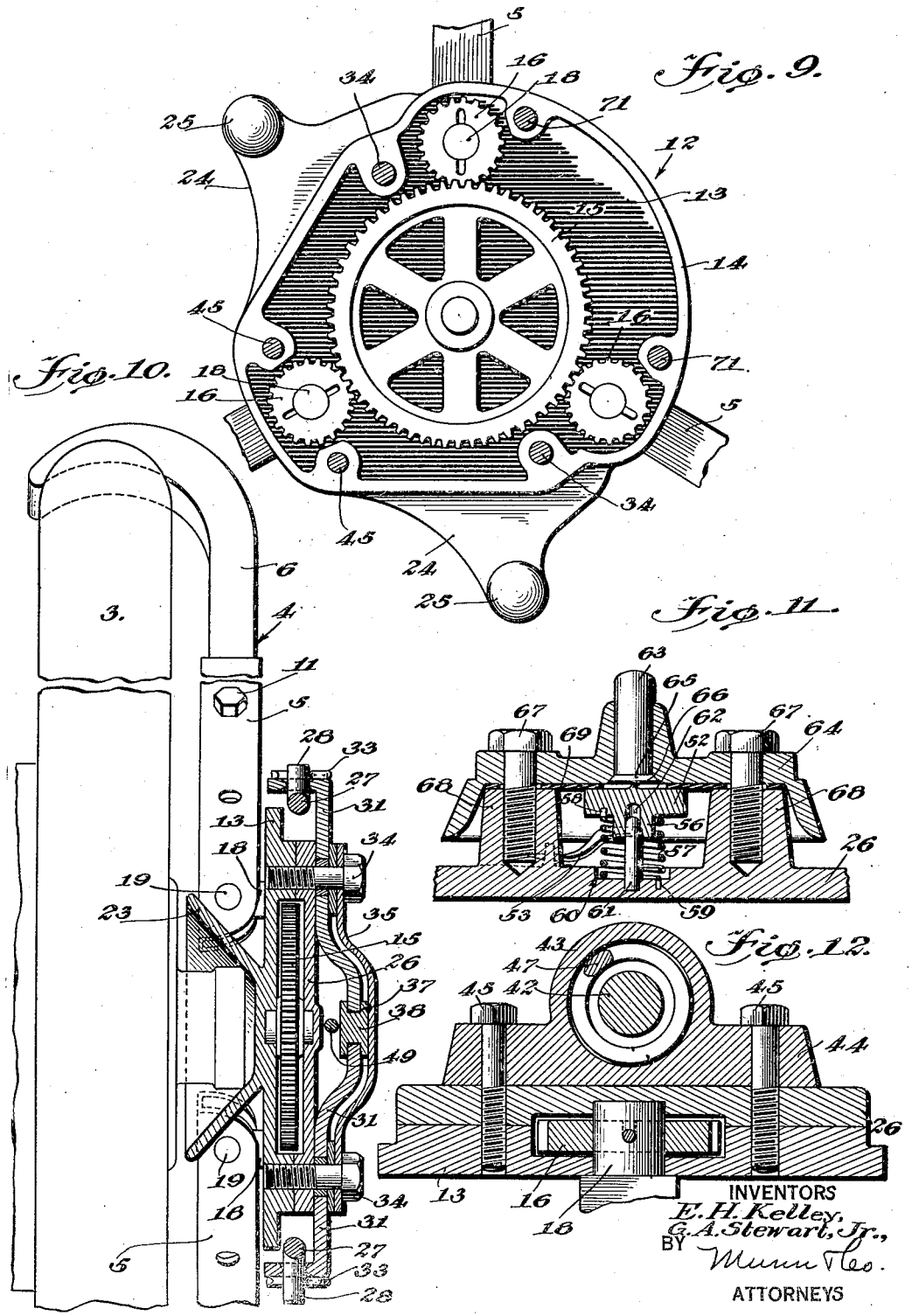

Patented Mar. 29, 1932

1,851,123

UNITED STATES PATENT OFFICE

EMMOR H. KELLEY AND GEORGE A. STEWART, JR., OF SOUTH BROWNSVILLE, PENNSYLVANIA

AUTOMOBILE BRAKE TESTING DEVICE

Application filed March 16, 1928. Serial No. 262,137.

This invention relates to improvements in brake testing devices, and it consists of the constructions, combinations and arrangements herein described and claimed.

An object of the invention is to provide a device for accurately testing the brakes of a motor vehicle which device, although simple in construction, is adapted for use both by the private owner and by garages in a commercial way with equal facility.

Another object of the invention is to provide a brake testing device which is readily applied to the wheels by a single workman, and operated to quickly and easily test the brakes of a motor vehicle for equality.

Figure 1:
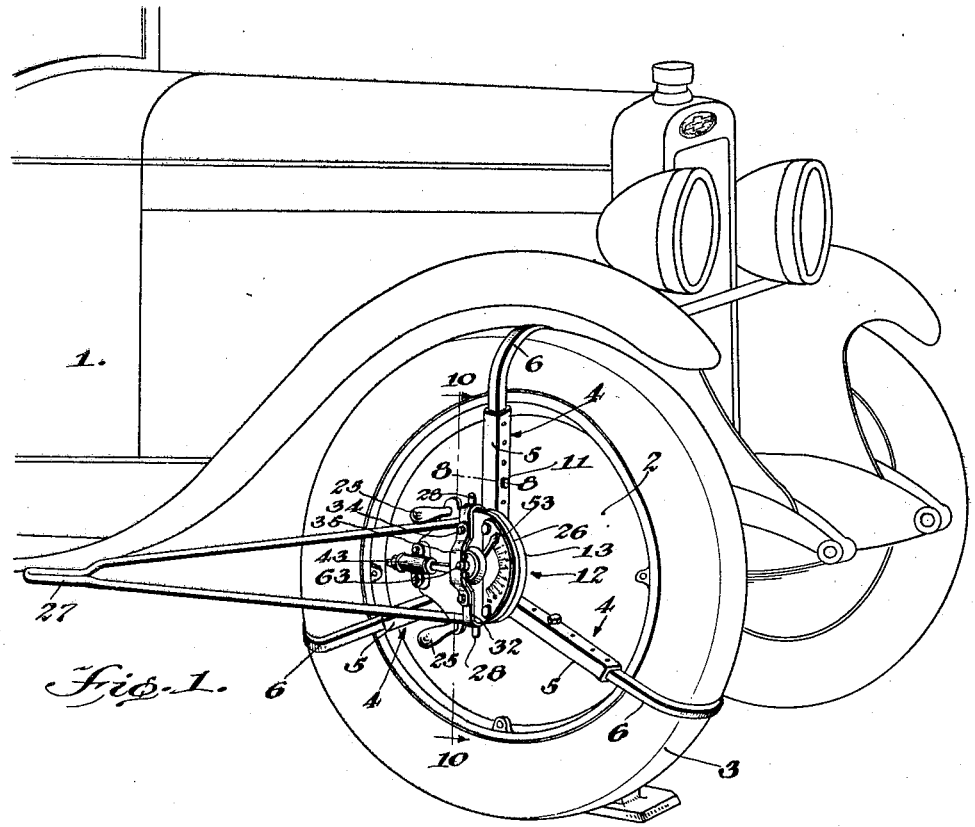
Figure 2:
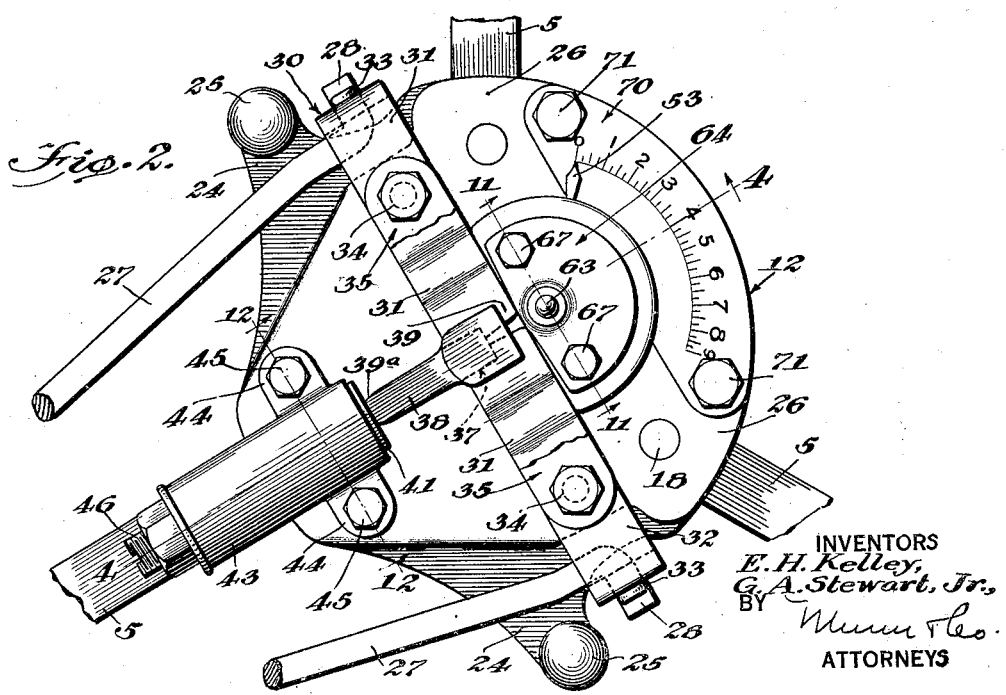

Other objects and advantages of the invention appear in the following specification, reference being had to the accompanying drawings in which, Figure 1 is a perspective view of a portion of a motor vehicle illustrating the device applied to one of the wheels, Figure 2 is an elevation of the device, portions being broken away, Figure 3 is an elevation of the device showing the position of the parts as a result of a testing operation, portions of the structure being broken away.

Figure 4 is a longitudinal section taken on the line 4—4 of Figure 2,

Figure 5 is a detail perspective view of the indicator hand and its associated parts, Figure 6 is a detail perspective view of the abutment stem, Figure 7 is a detail perspective view of one of the components of the tire gripping arms, Figure 8 is a detail cross section taken on the line 8—8 of Figure 1, Figure 9 is a horizontal section taken on the line 9—9 of Figure 4, Figure 10 is a vertical section taken substantially on the line 10—10 of Figure 1, Figure 11 is a detail cross section taken on the line 11—11 of Figure 2, Figure 12 is a detail cross section taken on the line 12—12 of Figure 2, Figure 13 is a detail perspective view of one of the pair of levers.

Equality or approximate equality, in the adjustment of motor vehicle brakes is a factor that is persistently emphasized as contributing in a very large measure to efficient brake operation. It is known that unequally adjusted brakes may cause skidding of the vehicle more readily than anything else when such brakes are suddenly applied in wet and snowy weather.

The increased use of four-wheel brakes imposes an additional reason why there should be co-ordination between the various brakes. While it is true that the braking effect of the rear wheel brakes should be more positive than that of the front wheel brakes, yet the two sets of brakes should be adjusted to work equally so that the ratio of the front and rear wheels on each side of the vehicle may be the same.

As has been indicated already, the improved brake testing device is of a nature that it can be applied and operated by one man with ease. A prerequisite is to apply the brakes and then jack up one portion of the chassis so that access may be had to the adjacent wheel for the purpose of the test. The brakes are applied by using any suitable brake pedal depressor to be found on the market. The idea is to apply the brakes and hold them applied during the testing of all four wheels.

Reference is made to the drawings. The motor vehicle 1 in Figure 1 is to be regarded as of the four wheel brake type. In order that the brake of the wheel 2 may be tested, the adjacent corner of the chassis is jacked up sufficiently to raise the tire 3 from the ground, it being understood that the brakes of the vehicle are being held in the applied position.

For the purpose of attaching the testing device to the vehicle wheel the former is provided with a plurality of arms 4, each of which comprises two parts, namely a sleeve 5 and a hook 6. The sleeves and hooks are herein known as the tire gripping arms.

The hooks are designed to fit upon the tire 3 in the manner clearly shown in Figures 1 and 10. In practice the contacting edges of each hook will be fully rounded so that no injury to the tire surface may result from the twisting and pulling occurring during the making of a test. The shanks of the hooks are received by the sleeves 5 in which they are adjustable so that the device may be applied to various sizes of wheels. A pin 7 (Fig. 8) is insertable through a hole 8 in the shank of a hook and through a registering pair 9 of a plurality of pairs of apertures in the sleeve 5 thus to fix a particular relative adjustment. The pin 7 is threaded near one extremity to engage the internal threads of one of the apertures 9. A point 10 of the pin enables finding the remote aperture more readily upon insertion of the pin. A head 11 permits screwing the pin in by the fingers of the operator.

A base, generally indicated 12 includes a rear plate 13 with a perpendicular wall 14 of sufficient height to provide a casing for the planetary arrangement of gears illustrated in Figure 9. The central or sun gear 15 has three pinions 16 in mesh therewith. Each of these is to be identified with one of the tire gripping arms. The pinions and the arms are connected so that a swinging motion of one arm will produce a corresponding motion of the remaining arms. Or, what is the same in effect, a turning motion of the base 12 will produce a simultaneous angular adjustment of each of the gripping arms. Were it not for the use of the gear 15 and the pinions 16 the arms 4 would be undesirably free to swing in reference to the base 12. Although the same gripping function of the tire by the arms would be gotten by merely pivoting the arms to the base 12, the sun gear and its pinion connections with the arm has the result of always keeping the arms in uniform relationships to the base.

Connection of the arms 4 with the pinions 16 is made with the laterally extended head 17 of the stud 18 to which the respective pinion 16 is attached. The studs 18 (Fig. 4) constitute pivotal connections of the arms 4 (Fig. 1) with the base 12. It is to be observed (Figs. 4 and 9) that the studs 18 are parallel to the major axis of the device. This being the case, the arms will swing in a common plane transversely of the axis of the wheel, and by virtue of the pinion connections 16 (Fig. 9) with the sun gear 15 the swinging is performed simultaneously. A pin 19 provides a pivotal connection between the arm 4 and head 17. Limited swinging movement of the arms 4 is permitted because the thickness of each head 17 (Fig. 4) is less than the distance between adjacent opposite walls of the sleeve 5. A recess 20 in one side of the head 17 receives a spring 21 that bears against one of the opposite walls, thus tending to swing the arm 4 away from the base 12 and toward the wheel. It is to be observed that the pins 19 (Fig. 10) extend transversely of the wheel, thereby so pivotally mounting the arms 4 upon the studs 18 of which the pins 19 are a part, as to enable a swinging in and out of the arms in the general direction of the axle or spindle. The importance of the latter provision is the ability to compensate for abnormally long hubs.

For instance, Figure 10 illustrates the application of the testing device to a wheel having what one might call a short hub. Suppose the hub extended out three times as far. The base 12 of the testing device would assume the same position at the end of the hub, but the arms 4 would be inclined toward the wheel 3 by virtue of having been swung on the pivots 19, it being clear that the necessary adjustment as to the length of the arms 4 was made by setting the pins 7 (Fig. 8) into another set of holes 8, 9 in the respective shanks and sleeves of the arms. A shoulder 22 formed on the stud 18, rides on back of the rear plate 13. The reduced portion of the stud extends through the rear plate and the respective pinion 16, to which it is appropriately affixed.

A bell 23 on back of the rear plate 13 exercises a centering function. The bell fits over the hub cap of the wheel as illustrated in Figure 10, and thus assists in holding the device in the center of the wheel so that there will be a uniformity of action when the test is made. Ears 24 extending from the rear plate 13 support handles 25 the primary purposes of which are to afford a brace for the operator in manipulating the device and to act as a guard for the recording mechanism should the testing device be laid face down on the floor. Assuming the device to have been placed in the operative position upon a wheel, the operator will apply power to the handle lever, later described, and may aid his own efforts in manipulating the device by bracing himself against one of the handles 25.

A cover 26 conceals and protects the gearing in Figure 9. It also provides a mounting for the essential indicating features particularly shown in Figures 1 and 2. These features are brought into action by moving a handle lever 27. This member is forked in shape, the extremities 28 (Fig. 2) being bent at a sharp angle to provide trunnions which fit into apertures 29 (Fig. 13) in the angled ends 30 of a pair of compression levers 31 and 32.

Slight swinging of the handle lever 27 toward and away from the motor vehicle is permissible. The extremities 28 are bent at the sharp angle mentioned so that the limited swinging movement may occur without impediment. Cotter pins 33, inserted through the exposed ends of the trunnions 28, keep the handle lever 27 in connection with the levers 31 and 32. The latter are pivotally connected to the base 12 by means of stud bolts 34 which, in addition to assisting in securing the cover 26 to the rear plate 13, serve as the means of attachment of a guard 35.

The confronting ends of the compression levers 31 and 32 are notched at 36 (Fig. 3) to fit into the groove 37 of an abutment stem 38, and to provide heels 39 to press against the adjacent end of the stem 38 at the base of the notch at that end when the handle lever 27 is shifted in the opposite direction. For example, an upward pull on the extremity of the handle 27 in Figure 1 will rock the levers 31 and 32 so that the heel 39 of one of the levers will press against the stem 38 (see Fig. 3) while the other will be released therefrom. This pressure produces a push upon the stem 38.

A yielding abutment receives the foregoing push of the abutment stem 38. The end of the latter, opposite to the groove 37, is pointed and rounded somewhat at 39$^a$ in order to readily fit a recess 40 in the head 41 of a spring follower 42. The head closely fits a cylinder 43 which is open at one end and closed at the other. It has ears 44 which receive stud bolts 45 by which both the abutment cylinder and the cover 26 are secured to the rear plate 13.

A screw stem 46 (Fig. 4), carried by the closed end of the cylinder provides an abutment for the spring follower 42. The screw stem is capable of adjustment in respect to the cylinder so that the follower 42 may move various distances before engaging the screw stem. A heavy coil spring 47, situated in the cylinder 43 between the closed end thereof and the head 41 holds the spring follower in an extended position in reference to the abutment cylinder.

An ear 47$^a$ on the underside of the abutment stem 38 has an aperture 48 to receive and guide a pull rod 49 which forms part of an indicator. One end of the rod carries a sleeve 50 that may be adjusted but which is fixed in its adjustments by a screw 51. The sleeve is engageable by the ear 47$^a$ so that the foregoing push of the abutment stem 38 is transmitted to the pull rod 49 by which it is converted into turning motion so far as the rotary head 52 and indicator hand 53 are concerned.

Connection between the rod 49 and head 52 is made by bending the end of the rod as at 54 to form a crank. This crank turns in an aperture near the periphery of the head 52. The axis of the aperture is parallel to that upon which the head turns. The adjacent part of the rod is bent into semi-circular or other appropriate shape 55 to avoid the hub 56 when the rod 49 assumes a released position and the hand 53 stands at 0.

Departure of the indicator hand 53 from the latter position is mildly resisted by a coil spring 57, the bent ends 58 and 59 of which are seated in holes respectively in the rotary head 52 and the bottom of a recess 60 (Fig. 11) in the cover 26. A guide pin 61 in the center of the recess 60 fits into a hole 62 extending through the hub 56 and partly into the rotary head 52 (Fig. 11). The other end of the pin 61 falls short of the bottom of the hole 62 thus permitting axial movement of the head in respect to the pin against the tension of the spring 57.

This movement is produced by a plunger button 63. The button is carried by a covering hood 64 below the edge of which the indicator hand 53 appears. The inner end of the button is slightly enlarged, for example as at 65, so that it will not drop out. The latter end of the button rides upon a central point 66 of the rotary head 52. The button is depressed when it is desired to permit the indicator hand 53 to return to 0. The engagement of the rotary head 52 by the button 63 is confined to the central point 66 so that the return of the rotary head and the indicator hand under the influence of the spring 57 is accomplished with minimum resistance.

Studs 67 secure the hub 64 to the cover 26, these being screwed into bosses 68 of sufficient height to provide ample space for the foregoing parts of the indicator. A fibre or other washer 69 between the hood and bosses provides a friction or brake surface against which the spring 57 holds the head 52 in an adjusted position as a result of a brake test.

A scale plate 70 (Fig. 2) is provided with suitable graduations running from 0 upwards so that comparative tests may be noted. The graduations are large so that the position of the indicator hand 53 in respect thereto can be readily noted. The graduations are provided for comparison only. The result of a test of one brake may indicate "5" on the scale. The object would be to make such adjustments of the companion brake that a test thereof would result in the registration of a corresponding "5". Screws 71 secure the scale and also assist in holding the cover 26 upon the rear plate 13.

The operation is readily understood. It is assumed that the wheel 2 nearest the observer of Figure 1 has been raised sufficiently to hold the tire 3 out of contact with the ground. The brakes of all four wheels must be regarded as set, being held so by a brake pedal depressor. As previously stated, the operator may lift the device into position either by grasping one of the arms 4 or one or both of the handles 25. The device is not heavy and is readily manipulated.

The gripping arms 4 are applied to the tire 3. The handle lever 27 extends off to the left of the operator when facing the wheel on the right side of the vehicle. Having placed the device in position, the first step is to eliminate most of the looseness between the hooks 6 and the tire. This may be accomplished, and in practice preferably will be accomplished, by pulling up or bearing down on the handle lever 27. An optional mode of turning the base 12 for the foregoing purpose is to employ the handles 25. In other words, a turn of the base 12 will produce simultaneous turning of all of the gripping arms. These will assume slightly angled positions relative to the base, and when the initial adjustment is completed the operator may lift the extremity of the handle lever 27.

Ordinarily the operator may exert as much effort as he would in lifting, say 100 pounds. The compression levers 31 and 32 will be moved from the normal position in Figure 2 to the position in Figure 3. The lever 31 will press against the adjacent end of the abutment stem 38. The other lever 32 will be released therefrom. The push upon the stem 38 will be resisted by the abutment spring 47, but the latter will yield to an extent.

The sun gear 15 and its meshing pinions 16, by which uniform motion of the arms 4 as well as the stabilization thereof in reference to the base 12 is attained, have the additional and important effect of coacting with the cushioning effect of the tire on the hooks 6 in preventing the indicator hand 53 from jumping over the scale plate 70 should the operator manipulate the handle lever 27 with a jerky motion. In other words, the resiliency of the tire combines with the equalizing function of the gears to overcome the impact against the spring 47 thus to enforce a uniform application of moving power to the indicator hand.

Movement of the stem 38, resulting from the push thereon, will cause the ear 47ª Figure 4 to push upon the pull rod 49. The rotary head 52 will be turned against the tension of the spring 57. The indicator hand 53 moves with the head 52 and registers its position over the graduations on the scale 70.

Inasmuch as the spring 57 presses the head 52 against the friction washer 69, the adjusted position of the indicator hand will be held for inspection until the operator depresses the plunger button 63. The momentary release of the head 52 from the friction washer 69 will permit the spring 57 to turn the head in the opposite direction, restoring the indicator hand to 0.

Should the operator prefer to press down upon the handle 27, the compression lever 32 (Fig. 3) would come into play. That lever would then act upon the abutment stem 38 with the same result upon the indicator hand. As already indicated, the object of the test is to obtain the same indication upon the scale 70 for each pair of wheels. If the foregoing operation in respect to the wheel 2 results in the registration of "5" upon the scale, a test of the other front wheel should also register "5". If the test registers more or less, appropriate adjustments of the brake must be made until both wheels register the same.

While the construction and arrangement of the improved brake testing device is that of a generally preferred form, obviously modifications and changes may be made without departing from the spirit of the invention or the scope of the claims.

We claim:—

1. In a brake testing device, means for applying the device to a wheel having a brake to be tested and centering said device in respect thereto, said means including arms to engage over the periphery of the wheel, and a bell to fit over the hub cap of said wheel.

2. A testing device comprising a base, a plurality of arms applicable to a wheel, and means by which the arms are separately pivoted to the base in a common plane transversely of the axis of the wheel, and means included in the base enabling centralization in respect to the wheel axis and an initial radial disposition of the arms.

3. A testing device comprising a base, a plurality of arms applicable to a wheel, separate pivot means parallel to the axis of the wheel by which the arms are separately pivoted to the base, and a handle on the base for lifting the device into position and turning the base about the wheel axis to shift the separate pivot means when applying the arms to said wheel.

4. A brake testing device comprising a base which includes a rear plate, a plurality of arms, means by which the arms are loosely connected with the base permitting preliminary adjustments when applying the arms to a wheel having a brake to be tested, and a bell carried by the rear plate fitting over the hub cap of the wheel as the result of said adjustments, thus centering the device.

5. A brake testing device comprising a base, a plurality of arms terminating in hooks to grip the tire of a wheel, studs by which the arms are revolubly mounted upon the base, and gearing connecting the studs causing simultaneous turning of the studs and arms upon a turn of the base to eliminate looseness and effect a tight grip of the hooks upon the tire.

6. A brake testing device comprising a base, a plurality of arms having hooks, studs carrying the arms and being revolubly mounted upon the base, a pinion carried by each stud, and a sun gear carried by the base meshing with the pinion.

7. A brake testing device comprising a base, a plurality of arms having hooks, studs revolubly mounted on the base, means pivotally connecting the arms to the studs permitting limited swinging of the arms in one direction, a pinion carried by each stud and a sun gear carried by the base meshing with the pinions and causing simultaneous turning of the studs and arms in other directions.

8. In a brake testing device, a base, a tire gripping arm including a sleeve, a stud by which the arm is connected with the base, a head on the stud loosely received by the sleeve to permit limited swinging movement, a pin by which the sleeve is pivoted to the head, and a spring seated in the recess bearing against the sleeve tending to resist said movement.

9. In a brake testing device, a base having a rear plate, a tire gripping arm, a stud revolubly mounted in the rear plate having a shoulder bearing on one side thereof, a pinion fixed on the stud at the other side of the plate holding the stud in place, and means to pivotally connect the arm with the stud.

10. A brake testing device comprising arms to grip the tire of a wheel having a brake to be tested, a base upon which the arms are assembled, a handle lever permitting the exertion of an effort to turn the base, levers to which the handle is connected, said levers being pivoted upon the base, and means upon which said effort is expended through one of the levers to produce a comparative indication.

11. A brake testing device comprising a base, means to attach the base to a wheel having a brake to be tested, a handle lever permitting the exertion of an effort to turn the base, a pair of levers pivoted on the base to which the lever handle is connected, an indicator hand, and means upon which said effort is expended through one of the levers to move the indicator hand.

12. A brake testing device comprising a base, means to attach the base to a wheel having a brake to be tested, a handle lever permitting the exertion of an effort to turn the base, a pair of levers pivoted on the base to which the lever handle is connected, an indicator hand, means upon which said effort is expended through one of the levers to move the indicator hand, and means to hold said hand in the position to which it is moved upon termination of said effort.

13. A brake testing device comprising a base, means to attach the base to a wheel having a brake to be tested, a handle lever permitting the exertion of an effort to turn the base, a pair of levers pivoted on the base to which the lever handle is connected, an indicator hand, means upon which said effort is expended through one of the levers to move the indicator hand, means to hold said hand in the position to which it is moved upon termination of said effort, means by which the hand is released from said holding means, and means to then restore the hand to an original position.

14. A brake testing device comprising a base, means to apply the base to a wheel having a brake to be tested, a graduated scale on the base, an indicator hand, a handle lever permitting the exertion of an effort on the base to turn the wheel, levers pivoted on the base to which levers the handle is connected, and means receiving the thrust of one of the levers during said effort upon the handle to move the hand over the scale, one of said graduations being an indication for comparison.

15. A brake testing device comprising a base, means by which the base is attached to a wheel having a brake to be tested, an indicator hand, a handle lever for exerting an effort on the base to turn the wheel, a lever pivoted on the base to which the lever handle is connected, a movable stem against which the pressure of the lever is exerted, a yielding abutment limiting the movement of the stem, and means by which the movement of the stem is transferred to the indicator hand.

16. A brake testing device comprising a base, means by which the base is attached to a wheel having a brake to be tested, an indicator hand, a handle lever for exerting an effort on the base to turn the wheel, a lever pivoted on the base having the handle attached thereto, a rectilinearly movable stem receiving the thrust of the lever, a yielding abutment limiting the movement of the stem, and means converting the rectilinear movement of the stem to turning movement of the hand.

17. A brake testing device comprising a base, means to attach the base to a wheel having a brake to be tested, a rotary head having a hand, a handle lever for exerting an effort on the base to turn the wheel, a lever pivoted on the base having the handle attached thereto, a rectilinearly movable stem receiving the thrust of the lever, an ear on the stem, a yielding abutment to limit the movement of the stem, a pull rod having one end connected with the rotary head and the other loosely passing through the ear, and means on the rod causing the movement of the stem to turn the head.

18. A brake testing device comprising a base, means to attach the base to an object to be tested, an indicator hand, a rotary head carried by the base and having the hand attached thereto, means to turn the head upon shifting the base in a testing operation to move the hand in one direction, means having a friction surface against which the head turns, and means for releasing the head from said surface to permit movement of the hand in the opposite direction.

19. A brake testing device, comprising a base, means to attach the base to an object to be tested, an indicator hand, a rotary head carried by the base and having the hand attached thereto, means to turn the head upon shifting the base in a testing operation to move the hand in one direction, means having a friction surface against which the head turns, resilient means pressing the head against said surface tending to hold the hand in an adjusted position, and means for disengaging the head from said surface permitting the resilient means to return the head and move the hand in the opposite direction.

20. A brake testing device comprising a base, means to attach the base to an object to be tested, an indicator hand, a rotary head to which the hand is attached, being carried by said base and having a central contact point, means to turn the head upon shifting the base in a testing operation to move the hand in one direction, means having a friction surface with which the head engages, a spring resting on the base and holding the head against the surface against the tension of which spring the head may turn, and a plunger button bearing on the contact point permitting depression of the head from said surface and counter-movement of the head and hand.

21. A brake testing device comprising base, means to attach the base to an object to be tested, an indicator hand, a rotary head to which the hand is attached, being carried by said base and having a hole, a guide pin received by the hole, a coil spring fixed on the base at one end and attached to the head at the other, means to turn the head upon shifting the base in a testing operation to move the hand against the tension of the spring, means having a friction surface against which the head turns and holding the head in an adjusted position, and means for moving the head upon the guide pin away from said friction surface permitting counter-movement of the head and hand by virtue of said spring.

22. A brake testing device comprising a base, means to attach the base to a wheel having a brake to be tested, means for exerting an effort on the base to turn the wheel, a pair of levers pivoted on the base to which said means is attached, said levers having notched end providing heels, a stem having a groove receiving the notched ends permitting the application of the pressure of the levers against said stem through said heels, a yielding abutment limiting the movement of the stem, an indicator hand, and means for transmitting the movement of the stem to the indicator hand.

23. A plurality of arms to grip a wheel, a base to which the inner ends of the arms are pivotally mounted, and means to turn the base so that a turning of the base will incline the arms from radial positions in respect to the center of the wheel.

24. A testing device comprising a base, registering means carried thereby, a plurality of arms pivoted on the base and engageable with a wheel having a brake to be tested, means used for lifting the base into operative position then turning the base to initially move the arms for eliminating lost motion therebetween and the wheel, and actuating means to subsequently apply force to the registering device thus to cause an operation of the base and a pull on said arms.

25. A testing device comprising a base, registering means carried by the base, arms movably carried by the base and engageable with a member having a brake to be tested, actuating means to simultaneously apply a registering force to the registering means and cause an operation of the base to pull the arms, and handles with which the base is equipped, extending from the base to guard the registering means when laid on the floor and providing a brace for the operator when applying force to said actuating means.

26. A testing device comprising a base, arms movably mounted on the base and having means to grip a resilient tire on a wheel having a brake to be tested, a base by which the arms are movably carried, registering means carried by the base including a scale plate and an indicator hand to traverse said plate, actuating means to simultaneously apply a registering force to the registering means and cause an operation of the base to pull the arms, and a planetary gear arrangement on the base comprising pinions carried by the movable mounts of the arms and a sun gear meshing with said pinions, said gear arrangement unifying and stabilizing the motion of the arms enabling the cushioning effect of the tire to compensate for jumping of the indicator hand in the event of a jerky action of the actuating means.

27. A testing device comprising a base, a plurality of tire-gripping arms pivotally mounted on the base, a sun gear carried by the base, and pinions on the pivotal mounts of the arms meshing with the sun gear to enable uniform but changing relationships of the arms to the base.

28. In a testing device, a base to be centralized in reference to the hub of a member having a brake to be tested, a plurality of arms to grip said member being carried by the base, and means to enable compensation in the testing device for hubs of varying lengths, said means consisting of pivots for the arms on the base extending transversely of the member and hub, and means for lengthening and shortening the arms.

29. In a testing device, a base to be centralized in respect to the hub of a member having a brake to be tested, said member having a resilient tire, a plurality of tire-gripping arms carried by the base, means by which the arms are pivotally mounted on the base on axes parallel to the axis of the hub, registering means carried by the base including a scale plate and an indicator hand to traverse said plate, and actuating means to simultaneously apply a registering force to the registering means and cause an operation of the base to pull the arms, the cushioning effect of the resilient tire on said arms having a steadying effect on the indicator hand in the event of a jerky action of the actuating means.

EMMOR H. KELLEY.
GEORGE A. STEWART, Jr.